(12) United States Patent
Braschel

(10) Patent No.: US 7,887,144 B2
(45) Date of Patent: Feb. 15, 2011

(54) ELECTRONIC SYSTEM FOR A MOTOR VEHICLE

(75) Inventor: Volker Braschel, Neuwied (DE)

(73) Assignee: Lucas Automotive GmbH (DE)

(*) Notice: Subject to any disclaimer, the term of this patent is extended or adjusted under 35 U.S.C. 154(b) by 0 days.

(21) Appl. No.: 11/032,274

(22) Filed: Jan. 10, 2005

(65) Prior Publication Data

US 2005/0127746 A1   Jun. 16, 2005

Related U.S. Application Data

(63) Continuation of application No. PCT/EP03/07518, filed on Jul. 10, 2003.

(30) Foreign Application Priority Data

Jul. 12, 2002 (DE) .................. 102 31 843

(51) Int. Cl.
*B60T 17/22* (2006.01)
(52) U.S. Cl. .................. 303/20; 303/199
(58) Field of Classification Search .......... 303/199, 303/20

See application file for complete search history.

(56) References Cited

U.S. PATENT DOCUMENTS

| | | | |
|---|---|---|---|
| 4,629,043 A | 12/1986 | Matsuo et al. | |
| 5,510,989 A * | 4/1996 | Zabler et al. | 701/1 |
| 5,737,188 A | 4/1998 | Flierl et al. | |
| 5,927,824 A * | 7/1999 | Pahl et al. | 303/113.2 |
| 6,139,117 A * | 10/2000 | Shirai et al. | 303/3 |
| 6,169,939 B1 * | 1/2001 | Raad et al. | 701/1 |
| 6,199,001 B1 * | 3/2001 | Ohta et al. | 701/51 |
| 6,215,672 B1 | 4/2001 | Warner et al. | |
| 6,256,562 B1 | 7/2001 | Frimberger et al. | |
| 6,256,569 B1 * | 7/2001 | Kobayashi | 701/70 |
| 6,285,944 B1 * | 9/2001 | Tange et al. | 701/96 |
| 6,324,458 B1 * | 11/2001 | Takagi et al. | 701/70 |
| 6,396,163 B1 * | 5/2002 | Sugiura et al. | 307/9.1 |
| 6,447,074 B2 * | 9/2002 | Engelhard | 303/3 |
| 6,685,281 B2 * | 2/2004 | MacGregor et al. | 303/123 |

(Continued)

FOREIGN PATENT DOCUMENTS

DE   196 45 079   5/1988

(Continued)

OTHER PUBLICATIONS

Automotive Handbook, Oct. 1996, Robert Bosch GmbH, 4th Edition, Vehicle Dynamics Control section, pp. 668-679.*

(Continued)

*Primary Examiner*—Thomas J Williams
(74) *Attorney, Agent, or Firm*—MacMillan, Sobanski & Todd, LLC

(57) ABSTRACT

In order to improve an electronic system for a motor vehicle which comprises an electronic controller which is coupled via an electronic communication system to electronic controllers of other electronic systems of the vehicle in order to co-operate through data exchanges with the other electronic systems of the vehicle, wherein electronic sensor devices for controlling and/or regulating operating states of the vehicle detect quantities which are related to the operating states of the vehicle, so as to obtain cost and functional advantages, it is proposed that at least one of the electronic sensor devices be accommodated in one of the electronic controllers.

5 Claims, 1 Drawing Sheet

U.S. PATENT DOCUMENTS

| | | | |
|---|---|---|---|
| 6,702,405 B1 * | 3/2004 | Balz et al. | 303/192 |
| 6,717,417 B2 | 4/2004 | Jungbauer et al. | |
| 6,728,620 B2 * | 4/2004 | Anwar | 701/70 |
| 2001/0023799 A1 * | 9/2001 | Engelhard | 188/151 R |
| 2002/0100647 A1 * | 8/2002 | Miyakawa et al. | 188/162 |
| 2003/0230933 A1 * | 12/2003 | Schneider et al. | 303/146 |
| 2005/0004732 A1 * | 1/2005 | Berry et al. | 701/48 |

FOREIGN PATENT DOCUMENTS

| | | |
|---|---|---|
| DE | 4129919 | 3/1993 |
| DE | 197 45 537 | 4/1999 |
| DE | 19755431 | 6/1999 |
| DE | 198 38 886 | 10/1999 |
| DE | 198 37 833 | 2/2000 |
| DE | 195 15 622 | 6/2000 |
| DE | 199 38 110 | 2/2001 |
| DE | 100 49 526 | 4/2002 |
| DE | 100 56 549 | 6/2002 |
| WO | 97/49578 | 12/1997 |
| WO | WO 0158714 | 8/2001 |

OTHER PUBLICATIONS

Bosch, Yaw Sensor (gyrometer) with micromechanical acceleration sensor, Oct. 2001.*

Document Bibliography and Abstract for DE 195 15 622 http://v3.espacenet.com/textdoc?DB=EPODOC&IDX=DE19515622&F=0, printed Jan. 4, 2005.

Document Bibliography and Abstract for DE 196 45 079 http://v3.espacenet.com/textdoc?DB=EPODOC&IDX=DE19645079&F=0, printed Jan. 4, 2005.

Document Bibliography and Abstract for DE 198 38 886 http://v3.espacenet.com/textdoc?DB=EPODOC&IDX=DE19838886&F=0, printed Jan. 4, 2005.

Document Bibliography and Abstract for DE 199 38 110 http://v3.espacenet.com/textdoc?DB=EPODOC&IDX=DE19938110&F=0, printed Jan. 4, 2005.

Document Bibliography and Abstract for DE 4129919 http://v3.espacenet.com/textdoc?DB=EPODOC&IDX=DE4129919&F=0, printed Mar. 5, 2007.

Document Bibliography and Abstract for DE 19755431 http://v3.espacenet.com/textdoc?DB=EPODOC&IDX=DE19755431&F=0, printed Mar. 5, 2007.

Document Bibliography and Abstract for WO 0158714 http://v3.espacenet.com/textdoc?DB=EPODOC&IDX= WO0158714&F=0, printed Mar. 5, 2007.

* cited by examiner

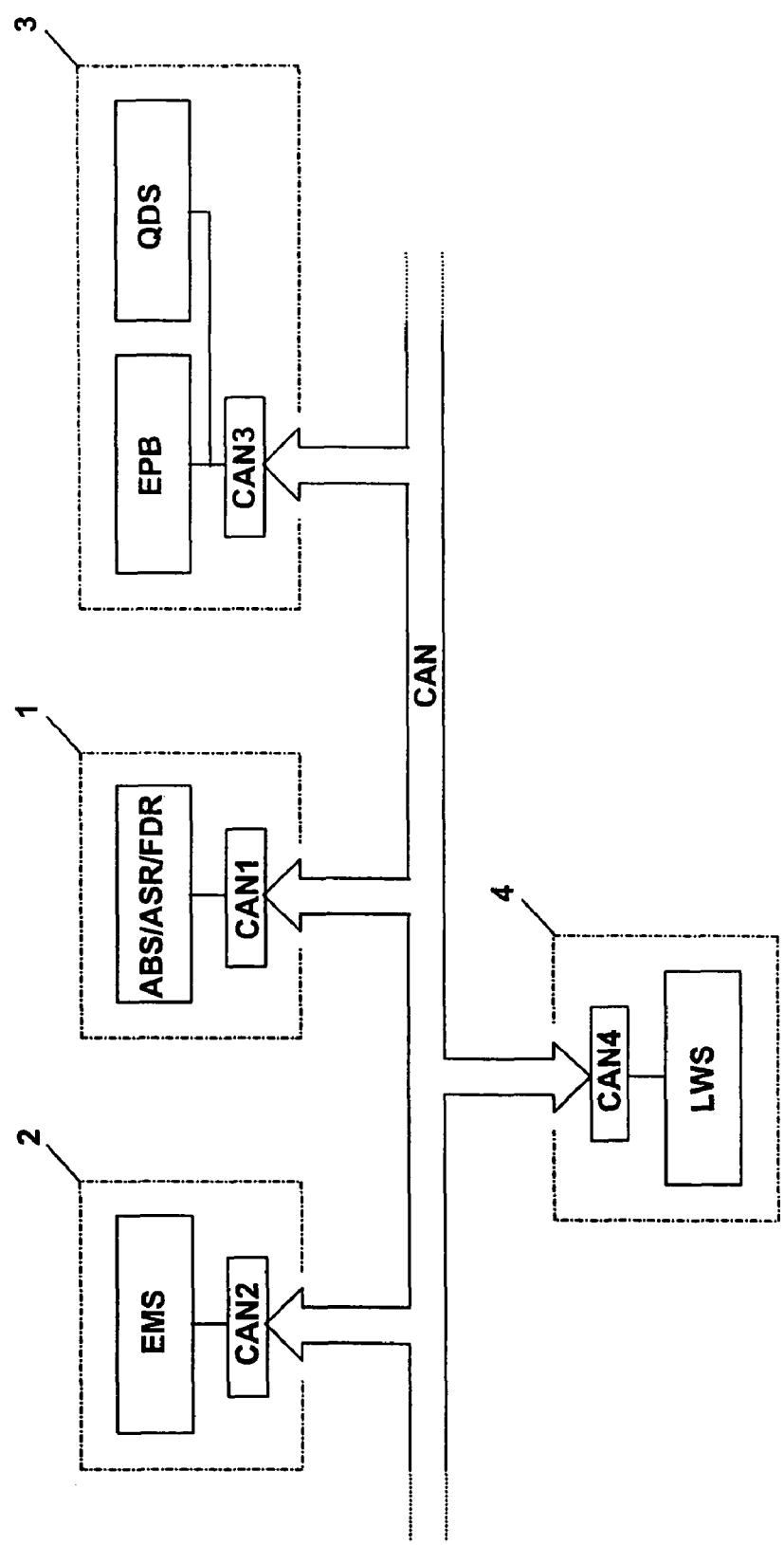

ELECTRONIC SYSTEM FOR A MOTOR VEHICLE

CROSS-REFERENCE TO RELATED APPLICATIONS

This application is continuation of International Application No. PCT/EP03/07518 filed Jul. 10, 2003, the disclosures of which are incorporated herein by reference, and which claimed priority to German Patent Application No. 102 31 843.3 filed Jul. 12, 2002, the disclosures of which are incorporated herein by reference.

SEQUENCE LISTING

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Field of the Invention

The invention relates to an electronic system for a motor vehicle which comprises an electronic controller which is coupled via an electronic communication system to electronic controllers of other electronic systems of the vehicle in order to co-operate through data exchanges with the other electronic systems of the vehicle, wherein electronic sensor devices for controlling and/or regulating operating states of the vehicle detect quantities which are related to the operating states of the vehicle.

2. Description of Related Art Including Information Described Under 37 CFR 1.97 and 1.98

A modern motor vehicle is fitted with many electronic systems. These include, inter alia, the electronic service brake system with the antilock braking system (ABS), the traction control system (ASR) and the dynamic stability control system (FDR), the electronic parking brake system (EPB) or the electronic engine management system (EMS). As is known, electronic systems of this kind comprise an electronic controller which detects via electronic sensor devices quantities which are related to operating states of the vehicle, e.g. the slip of the vehicle wheels in the case of the ABS or the speed of the vehicle engine in the case of the EMS. On the basis of the detected quantities, the electronic controller controls and/or regulates, via corresponding electrical final control devices, operating states of the vehicle in order, for example, to prevent locking of the vehicle wheels in the case of the ABS or adapt the output of the vehicle engine in the case of the EMS. In order that the individual electronic systems may exchange data with one another so as to co-operate, the electronic controllers are coupled together via an electronic communication system, e.g. CAN bus.

As the electronic sensor devices are to be accommodated at a measuring location in the region of the vehicle which is ideal for them, e.g. an electronic steering angle sensor device is to be disposed in the region of the steering column of the vehicle, these also as a rule require their own electronic controller, which is likewise to be coupled to the electronic communication system.

This entails the disadvantage of an increasingly large number of electronic controllers in the motor vehicle, in particular in view of the fact that modern motor vehicles will in future be fitted with an ever increasing number of and more diverse electronic systems.

The result is an increase in expenditure and costs. The fact that—because they are coupled to the electronic communication system—the electronic controllers even have to comprise their own interface circuits plays a significant part in this.

BRIEF SUMMARY OF THE INVENTION

The object of the invention is to counteract the above-mentioned disadvantage.

In order to achieve the object, given an electronic system as initially mentioned for a motor vehicle, the invention proposes that at least one of the electronic sensor devices be accommodated in one of the electronic controllers.

The advantage of this is that fewer electronic controllers are required, so that the system expenditure is reduced. As this results in a reduction in the number of components such as, e.g. controller housings, electrical connections, as well as interface, power supply and monitoring circuits, a substantial cost advantage is obtained. Moreover, by accommodating at least one of the electronic sensor devices in one of the electronic controllers, the system reliability is increased, as the number of fault-prone electrical connections is reduced.

It is possible, in a particularly advantageous manner, for the at least one electronic sensor device to detect the laterally dynamic and/or longitudinally dynamic behaviour of the vehicle. As is known, the main component of an electronic sensor device of this kind is a micromechanical oscillation gyro, which reacts sensitively to interference due to vibrations and temperature fluctuations. Such interference can be counteracted by preferably disposing the electronic controller in which the at least one sensor-device is accommodated in the region of the vehicle interior.

A considerable advantage is also achieved if the electronic controller in which the at least one electronic sensor device is accommodated controls and/or regulates the electronic parking brake system (EPB) of the motor vehicle. This is favourable in so far as the electronic controller is preferably disposed in the vehicle interior, e.g. below the rear seat bench. It is therefore relatively near the electrical final control devices of the EPB, which usually act on the rear wheel brakes of the vehicle.

There are also essential advantages in functional terms. For example, the EPB can directly access the longitudinal acceleration signal which is detected by the at least one electronic sensor device in order to establish from this the gradient of the roadway, and/or in order to be able to detect a vehicle standstill independently of other electronic systems. It is extremely important to detect a vehicle standstill for reasons of safety in particular, as failure of the electronic communication system or other electronic systems means that the EPB must decide independently whether the parking or holding brake is to be released or actuated.

The electronic controller in which the at least one electronic sensor device is accommodated preferably co-operates with the electronic controller which controls and/or regulates the electronic service brake system (ABS/ASR/FDR).

The invention also relates to a motor vehicle which is fitted with electronic systems according to the invention. For, considering the overall structure of all the electronic systems which co-operate in a motor vehicle, the advantages according to the invention which are obtained by reducing the number of electrical controllers have a particular effect.

Other advantages of this invention will become apparent to those skilled in the art from the following detailed description of the preferred embodiment, when read in light of the accompanying drawings.

BRIEF DESCRIPTION OF THE SEVERAL VIEWS OF THE DRAWING

FIG. 1 shows the co-operation of various electronic systems of a motor vehicle represented schematically.

DETAILED DESCRIPTION OF THE INVENTION

The electronic systems are an electronic service brake system, which comprises an antilock braking system (ABS), a traction control system (ASR) and a dynamic stability control system (FDR), an electronic parking brake or holding brake system (EPB) as well as an electronic engine management system (EMS).

The individual electronic systems comprise electronic controllers 1, 2 and 3 for controlling and/or regulating operating states of the vehicle. For this purpose the electronic controllers detect via electronic sensor devices quantities which are related to operating states of the vehicle in order to influence the operating states of the vehicle via corresponding electrical final control devices. The electronic controllers 1, 2 and 3 are coupled together via a bus or communication system called a "Controller Area Network" (CAN) so as to co-operate through data exchanges.

The ASR thus co-operates with the EMS in order to regulate the drive slip to reliable values not just by braking the driving wheel/wheels concerned independently of the driver, but also by reducing the driving torque at the driving wheel/wheels concerned, so that the driving wheel/wheels concerned is/are prevented from spinning.

In the same way the FDR co-operates with the EMS in order to actively assist the driver in laterally dynamic critical situations both by braking individual vehicle wheels independently of the driver and by reducing and/or increasing the driving torque, so that the vehicle is prevented from swerving to the side.

The EPB enables the parking or holding brake system to be released and actuated automatically. For this purpose the EPB requires, for example, information as to whether the vehicle is at a standstill and/or whether the ignition key has been removed, which is why the EPB co-operates via the CAN with the ABS and EMS. The EPB can thus establish, on the basis of the vehicle speed which the ABS determines from the speed of the individual vehicle wheels, whether the vehicle has actually reached its standstill, when the parking or holding brake system has to be automatically actuated.

Also coupled to the CAN are the electronic steering angle sensor device (LWS) and the electronic lateral dynamics device (QDS), both of which preferably cooperate with the FDR. The LWS detects the steering angle which is set by the driver and from which the FDR determines the desired behavior, while the QDS detects the actual laterally dynamic behavior of the vehicle, from which the FDR determines the actual behavior in order to regulate the vehicle behavior in the laterally dynamic limit range by comparing the desired with the actual behavior. As it is characteristic of the laterally dynamic behavior of the vehicle, the QDS detects at least the yaw velocity of the vehicle about its vertical axis and the lateral acceleration of the vehicle. The QDS also detects the longitudinal acceleration of the vehicle, in particular with regard to vehicles with all-wheel drives.

The LWS has its own electronic controller 4, where as the QDS is integrated into the electronic controller 3 which is provided for the EPB.

The electronic controllers 1 to 4 which are coupled to the CAN each comprise a CAN interface CAN1 to CAN4. These CAN interfaces manage the data exchange via the CAN and thus reduce the load on the actual computing units of the electronic controllers 1 to 4, which are as a rule utilised to full capacity on account of their actual range of functions.

The CAN enables the electronic controllers 1 to 4 to be disposed with flexibility in the region of the motor vehicle. The electronic controllers can as a result be disposed in the immediate vicinity of the respective final control device(s)—not represented in detail—which is/are to be activated by them, or are integrated with these to form a common integrated control unit. It is thus usual, for example, to combine the electronic controller 1 provided for the electronic service brake system ABS/ASR/FDR with the hydraulic unit or electromechanical actuator comprising the electrical final control devices (electromagnetic valve, electric motor, etc.) to form an integrated control unit, irrespective of whether the brake system in question is a conventional brake system with an ABS/ASR/FDR unit connected between the brake pressure transducer unit and the vehicle brakes or an electrohydraulic brake system (EHB) or an electromechanical brake system (EMB). The electronic controller 1 is consequently usually located in the region of the engine compartment of the vehicle.

The electronic controllers may likewise be disposed in the immediate vicinity of the electronic sensor device(s) associated with them or integrated with these to form a common electronic control unit. Thus, for example, the LWS must be disposed directly in the region of the steering column of the vehicle in order to detect the steering angle which is set by the driver. The electronic controller 4 comprising the LWS and the associated CAN interface CAN4 is therefore ideally disposed in the region of the steering column of the vehicle.

As the electronic final control device(s)—not represented in detail—of the EPB as a rule act(s) on the rear wheel brakes of the vehicle, and replace the conventional hand-brake lever in the case of a so-called "cable-puller" system, it is feasible to dispose the electronic controller 3 of the EPB in the region of the vehicle interior, e.g. below the rear seat bench or in the centre console, so that it is accommodated in a protected manner.

The QDS is integrated into the electronic controller 3 of the EPB. In the first place this has cost advantages with respect to the accommodation of the QDS in a separate electronic controller coupled to the CAN, as it is possible to dispense with components such as housings, electrical connections, power supply and monitoring circuits, and in particular a CAN interface. However there are in addition quite important advantages in functional terms.

The main component of the QDS is a yaw rate sensor for detecting the yaw velocity of the vehicle about its vertical axis. As is known, yaw rate sensors of this kind are micromechanical oscillation gyros which entail the problem of being highly fault-prone in the face of externally acting vibrations and temperature fluctuations, which may result in regulating errors. This is counteracted by the preferred accommodation of the electronic controller 3 of the EPB in the vehicle interior.

By accommodating the electronic controller 3 in the vehicle interior, the QDS is also located in the vicinity of or even at the centre of gravity of the vehicle, which increases measuring accuracy, as the response behaviour of the micromechanical gyro corresponds more accurately to the behaviour of the vehicle. This applies in particular in view of the fact that the QDS also detects the lateral and longitudinal acceleration of the vehicle.

In conjunction with the EMS, the EPB also serves to carry out automatic starting actions. In order that this may take place in particular on slopes—so-called "hill-hold function"—, the EPB is expressly fitted with an inclination sensor or a longitudinal acceleration sensor in order to establish the gradient of the roadway. It is possible to dispense with this inclination sensor, as the longitudinal acceleration of the vehicle is made available to the EPB directly through the QDS.

It is also technically feasible to integrate the QDS into the electronic controller of the ABS/ASR/FDR. However this does not provide the above-mentioned advantages, as the electronic controller 1 of the ABS/ASR/FDR is preferably accommodated in the engine compartment of the vehicle, so that the QDS would be exposed to considerable vibrations and temperature fluctuations. Since—as mentioned—the electronic controller 1 of the ABS/ASR/FDR is preferably integrated with the associated hydraulic unit to form an ABS/ASR/FDR integrated control unit, this entails the problem of having to install the integrated control unit in different positions in the vehicle, depending on the vehicle type/model. This means additional expenditure and costs, as there is no possibility of a standardized process for manufacturing the ABS/ASR/FDR integrated control units for the widest possible range of vehicle types/models. For the installation position of the micromechanical oscillation gyro of the QDS must be adapted in relation to the ABS/ASR/FDR integrated control unit to the respective installation position which is specific to the vehicle in order to guarantee proper functioning. This problem is avoided when the QDS is integrated into the electronic controller 3 of the EPB.

It is understood that not only is it possible to couple the electronic controllers of the above-mentioned electronic systems together by means of the electronic communication system, but—depending upon the equipment of the motor vehicle—it is also possible to couple in the same way, for example, the electronic controllers of an electronic transmission control, of an electronic distance/speed regulation system, of an electronic running gear regulation system or of an electronic steering system. The invention is in this respect also applicable, e.g. in the case of an electronic steering system, to the integration of the LWS into the electronic controller of the steering system, which controller, together with the associated electrical final control device (e.g. electric motor), is disposed in the region of the steering column of the vehicle.

It is understood that not only is it possible to couple the electronic controllers of the above-mentioned electronic systems together by means of the electronic communication system, but—depending on the equipment of the motor vehicle—it is also possible to couple in the same way, for example, the electronic controllers of an electronic transmission control, of an electronic distance/speed regulation system, of an electronic running gear regulation system or of an electronic steering system. The invention is in this respect also applicable, e.g. in the case of an electronic steering system, to the integration of the SAS into the electronic controller of the steering system, which controller, together with the associated electrical final control device (e.g. electric motor), is disposed in the region of the steering column of the vehicle.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An electronic system for a motor vehicle comprising:
an electronic communication system that includes a Controller Area Network;
a plurality of separate electronic controllers for controlling the operation of associated separate systems within the motor vehicle, each of said electronic controllers responsive to operating states of the motor vehicle to control, via final control devices, said motor vehicle operating states, said plurality of separate electronic controllers including at least an electronic parking brake controller that is operative to control an electronic parking brake system and that also is disposed within a passenger compartment of the vehicle and an electronic service brake controller that is separate from said electronic parking brake controller and that is operative to control an electronic service brake system, said plurality of separate electronic controllers coupled to said Controller Area Network and co-operating with one another to exchange data over said Controller Area Network; and
a plurality of electronic sensor devices for detecting quantities which are related to operating states of the vehicle, said electronic sensor devices coupled to said electronic controllers through said Controller Area Network with at least one of said electronic sensor devices being operable to detect lateral and longitudinal dynamic behaviour of the vehicle, said at least one sensor device being integrated into said electronic parking brake controller and operationally connected to said electronic parking brake controller with said electronic parking brake controller forwarding data generated by said at least one sensor device over said Controller Area Network to said electronic service brake controller, with said electronic service brake controller being operative to utilize said at least one sensor device data to regulate and control the vehicle behaviour in a lateral dynamic range via said electronic service brake system.

2. The electronic system according to claim 1, wherein said at least one sensor device that is accommodated in said electronic controller that detects both the lateral and longitudinal dynamic behaviour of the vehicle is a yaw sensor.

3. The electronic system according to claim 1 further including a plurality of electrical final control devices connected to said electronic controllers with said final control devices responsive to signals received from said electronic controllers to influence the operating states of the motor vehicle.

4. The electronic system according to claim 3 wherein at least one of said final control devices is connected to one of said electronic controllers via said communication system.

5. The electronic system according to claim 3, wherein said at least one sensor device that is accommodated in said electronic parking brake controller that detects both the lateral and longitudinal dynamic behaviour of the vehicle is a yaw sensor.

* * * * *